(12) United States Patent
Gruber et al.

(10) Patent No.: US 6,838,162 B1
(45) Date of Patent: Jan. 4, 2005

(54) FIBER-BUNDLE-REINFORCED COMPOSITE MATERIAL HAVING A CERAMIC MATRIX, METHOD FOR MANUFACTURING A COMPOSITE MATERIAL AND METHOD FOR MANUFACTURING ELEMENTS FORMED OF A COMPOSITE MATERIAL

(75) Inventors: Udo Gruber, Neusäss (DE); Michael Heine, Allmannshofen (DE); Andreas Kienzle, Thierhaupten (DE)

(73) Assignee: SGL Technik GmbH, Meitingen (DE)

( * ) Notice: Subject to any disclaimer, the term of this patent is extended or adjusted under 35 U.S.C. 154(b) by 51 days.

(21) Appl. No.: 09/663,582

(22) Filed: Sep. 18, 2000

(30) Foreign Application Priority Data

Sep. 16, 1999 (DE) .......................................... 199 44 345

(51) Int. Cl.[7] .......................... B32B 18/00; B32B 15/04; D02G 3/00
(52) U.S. Cl. ................................ 428/293.4; 428/294.4; 428/299.4; 428/367; 428/370; 428/372; 428/374; 428/384; 428/408
(58) Field of Search ......................... 428/293.4, 294.4, 428/299.4, 367, 370, 372, 374, 384, 408

(56) References Cited

U.S. PATENT DOCUMENTS

| | | | |
|---|---|---|---|
| 4,457,967 A | | 7/1984 | Chareire et al. ............. 428/212 |
| 4,610,917 A | * | 9/1986 | Yamamura et al. .......... 428/224 |
| 4,849,382 A | | 7/1989 | Shibata et al. ................ 501/95 |
| 5,202,293 A | | 4/1993 | Okamoto et al. ............. 501/95 |
| 5,354,398 A | * | 10/1994 | Kawai ...................... 156/89.26 |
| 5,488,017 A | * | 1/1996 | Szweda et al. ............... 501/95 |
| 5,531,943 A | | 7/1996 | Sudani et al. .............. 264/29.1 |
| 5,552,215 A | * | 9/1996 | Tredway et al. ............. 426/298 |
| 6,001,436 A | * | 12/1999 | Strasser et al. ............. 428/34.4 |
| 6,210,786 B1 | * | 4/2001 | Atmur et al. ............. 428/293.4 |
| 6,217,997 B1 | * | 4/2001 | Suyama et al. .......... 428/293.4 |
| 6,231,791 B1 | * | 5/2001 | Heine et al. ................ 264/29.5 |
| 6,235,379 B1 | * | 5/2001 | Kameda et al. .......... 428/293.4 |
| 6,254,975 B1 | * | 7/2001 | Kayser et al. ............ 428/293.4 |
| 6,261,981 B1 | * | 7/2001 | Dietrich et al. ............. 501/95.2 |
| 6,291,058 B1 | * | 9/2001 | Goujard et al. .......... 428/293.4 |
| 6,316,086 B1 | * | 11/2001 | Beier et al. ............... 428/293.4 |
| 6,335,105 B1 | * | 1/2002 | McKee ....................... 428/623 |
| 6,506,483 B1 | * | 1/2003 | Fehrenbacher et al. .. 428/293.4 |
| 6,537,654 B1 | * | 3/2003 | Gruber et al. ............ 428/293.4 |
| 6,666,310 B1 | * | 12/2003 | Berreth et al. ........... 188/251 A |

FOREIGN PATENT DOCUMENTS

| | | |
|---|---|---|
| EP | 0 402 915 A2 | 12/1990 |
| WO | WO 99/41069 | 8/1999 |

OTHER PUBLICATIONS

Hawley's Condensed Chemical Dictionary, 14th Edition, Richard J. Lewis, Sr., John Wiley & Sons, pp. 229, 534 and 956.*

* cited by examiner

Primary Examiner—Rena L. Dye
Assistant Examiner—Carnie S Thompson
(74) Attorney, Agent, or Firm—Laurence A. Greenberg; Werner H. Stemer; Ralph E. Locher

(57) ABSTRACT

A composite material includes a ceramic matrix and two different fractions of fiber bundles, namely a reinforcing fiber bundle fraction and a matrix fiber bundle fraction having different average fiber bundle lengths. The fractions of fiber bundles are separated in a total fiber bundle distribution relative to a fiber bundle length by a minimum. A method for manufacturing a composite material and a method for manufacturing elements formed of a composite material are also provided.

22 Claims, 6 Drawing Sheets

Fig. 5

PRIOR ART

FIBER-BUNDLE-REINFORCED COMPOSITE MATERIAL HAVING A CERAMIC MATRIX, METHOD FOR MANUFACTURING A COMPOSITE MATERIAL AND METHOD FOR MANUFACTURING ELEMENTS FORMED OF A COMPOSITE MATERIAL

BACKGROUND OF THE INVENTION

Field of the Invention

The present invention relates to a new fiber-bundle-reinforced composite material having a ceramic matrix, a method for manufacturing a composite material and a method for manufacturing elements formed of a composite material.

Composite materials reinforced with high-temperature-resistant fibers and/or fiber bundles, having a ceramic matrix, have been known for about 10 years and are employed in many applications where extremely great requirements are set for a material. Such requirements may be a great temperature resistance and simultaneous strength and ductility.

The extent to which the fiber-reinforced and/or fiber-bundle-reinforced composite materials with a ceramic matrix, that are referred to below as CMC composite materials for short, can be used in the field of applications for which temperature resistance is required at high temperatures, depends not in the least on the structure of the matrix of the composite materials. As long as the matrix of the composite materials is composed of various phases, the matrix structure at the surface of the CMC composite materials can be damaged by eluting of a matrix phase which melts at lower temperatures and which can be attacked by chemical processes such as oxidation, as a result of which the period of use of the CMC composite materials is restricted nowadays. Those problems become all the greater if a CMC material is additionally exposed to mechanical abrasion. Upon that occurrence, new crystallites of the matrix which are set free all the time can be attacked at lower temperatures and are decomposed very quickly. Moreover, gaps in the matrix structure which have been originated by the eluted crystallites offer a possibility for increased mechanical attack. Furthermore, the structure of the matrix with respect to cracks also plays a part in stress acting on CMC materials by mechanical loading, because in the case of a matrix with cracks, matrix components can also be mechanically pulled out of the composite material much more easily.

Fields of application of CMC composite materials where the mechanical load plays a substantial part are, for example, the use of CMC elements as sliding bearing components and friction linings, such as brake discs and brake linings. First of all, in the field of friction linings, above all carbon-fiber-reinforced composite materials with a carbon matrix, so-called CFC composite materials, have been used. However, they had the disadvantage of a temperature resistance of the material, which is insufficient against an oxidative attack. Therefore, efforts are meanwhile being made to replace the carbon matrix of the composite material by a matrix which is more resistant to oxidation. In that respect, above all, the SiC matrix, which is resistant to oxidation at substantially higher temperatures (1500° C.), is used with and without an additional surface protection layer. Therefore, today the use, above all, of carbon-fiber-reinforced composite materials with a SiC matrix, referred to below as C/SiC composite materials, is provided for friction linings such as brake discs and brake linings.

In the meantime there are a number of methods for a manufacturing C/SiC composite materials, in particular even with the intention of using them as components of brake systems. Therefore, methods are described in German Published, Non-Prosecuted Patent Application DE 197 10 105 A1 and German Patent DE 197 11 829 C1 for manufacturing C/SiC composite materials where fiber bundles provided with at least one carbon layer or with a solidified layer of a binder are mixed with carbonaceous binders with or without additional fillers. The mixtures are then pressed and cured before they are carbonized, possibly graphitized and finally infiltrated with liquid silicon.

A modified method for manufacturing C/SiC composite materials is described in German Patent DE 197 49 462 C1. In that case a preform made of a fabric of carbon fibers is infiltrated in the first instance with a resin and subsequently cured. As already described regarding the other methods, a green body produced in that way is then carbonized, and infiltrated with liquid silicon.

All C/SiC composite materials manufactured heretofore according to the above-described methods have an inhomogeneous matrix structure which, in the case of the methods according to German Published, Non-Prosecuted Patent Application DE 197 10 105 A1 and German Patent DE 197 11 829 C1, manifests itself in the matrix having large cracks that follow a path between the individual fibers and/or fiber bundles of the composite material. That is caused by the clearly different coefficients of thermal expansion of the carbon fibers and the formed SiC of the matrix. As a result thereof, during the cooling of the siliconized samples, stress is induced in the matrix which relaxes due to the cracks (according to an article in Werkstoffwoche [Material Week] '98, Volume VII, p. 551). Moreover, the matrix also has phases of pure carbon and/or silicon and therefore has no homogeneous matrix composition. The carbon zones oxidize at higher temperature load, i.e. are burned-out out of the composite material, and the silicon zones are already melting at a temperature of about 1400° C. Therefore, those methods have heretofore failed to achieve a matrix structure of the C/SiC composite materials which is suitable for withstanding permanent temperature loads at high temperatures. In particularly, they have failed at additional mechanical load.

In addition, C/SiC composite materials manufactured according to the method of German Patent DE 197 49 462 C1 do not have a homogeneous matrix. In that method of manufacture large cracks are already deliberately generated in the matrix during the carbonization process. Those cracks are then filled during the final siliconizing with liquid silicon, which reacts with the carbon matrix to form SiC. However, carbon zones in the matrix which are not totally converted into SiC and the structure of the cracks in the matrix still exist.

With those conventionally used methods for manufacturing C/SiC composite materials, it has therefore heretofore not been feasible to manufacture a C/SiC composite material which has a fraction of the silicon and carbon phase as small as possible and as far as possible has no crack structure or a crack structure which does not have a negative effect during stress due to mechanical loading. A C/SiC composite material with a fraction of the silicon and carbon phase that is as small as possible can nevertheless be achieved with another method. In that method according to German Published, Non-Prosecuted Patent Application DE 197 36 560 A1 silicon carbide powder, which possesses a fine grain fraction with an average grain size of at most 2 μm and a coarse grain fraction with an average grain size between 1.5

µm and 30 µm, is mixed with the reinforcing fibers, then molded and subsequently sintered. Since a C/SiC composite material body with open pores is produced in that way, it has subsequently to be infiltrated with a carbonizable matter, then to be carbonized and finally, as usual, to be infiltrated with liquid silicon and to be siliconized. That method of manufacture indeed leads to the aim of an improved matrix, but compared with the other methods it has the disadvantage of requiring, even after the first formation of a SiC matrix, a further infiltration step with a carbon-donating material and a subsequent siliconizing, as a result of which an economical production of C/SiC composite materials is no longer provided through the use of the method. Moreover, the problem of the crack structure is not solved by that method.

SUMMARY OF THE INVENTION

It is accordingly an object of the invention to provide a fiber-bundle-reinforced composite material having a ceramic matrix, a method for manufacturing a composite material and a method for manufacturing elements formed of a composite material, which overcome the hereinafore-mentioned disadvantages of the heretofore-known materials and methods of this general type, in which the materials have an improved matrix as compared with the prior art, with a phase composition as homogeneous as possible and at most a fine crack structure and in which the materials can be manufactured according to the heretofore-used methods.

With the foregoing and other objects in view there is provided, in accordance with the invention, a composite material, comprising a ceramic matrix; and two different fractions of fiber bundles including a reinforcing fiber bundle fraction and a matrix fiber bundle fraction having different average fiber bundle lengths, the fractions of fiber bundles separated by a minimum in a total fiber bundle distribution of the weight of the fiber bundles being a function of a fiber bundle length.

Accordingly, the CMC composite material, on one hand, contains a fraction of fiber bundles which at least on the average have a significantly greater fiber bundle length than that of the other fiber bundle fraction.

Composite materials according to the invention possess a substantial reinforcing component of the fiber bundles, i.e. bundles of single fibers. Single fibers, on the other hand, are present in the composite material at most to such an extent that they do not contribute substantially to the reinforcement of the composite material.

The effect of the fiber bundles of the fiber bundle fraction having the greater fiber length in the composite materials according to the invention corresponds to the reinforcing and ductilizing effect of fiber bundles in CMC materials, as is already known according to the prior art for CMC materials. This fiber bundle fraction is therefore referred to below as a reinforcing fiber bundle fraction.

However, the effect of the second fiber bundle fraction which differs from the reinforcing fiber bundle fraction at least by a substantially smaller average fiber bundle length, was surprising. Other than at the reinforcing fiber bundle fraction, this fraction not only has a reinforcing effect in the conventional sense of the prior art. Much more importantly, this fiber bundle fraction with a smaller average fiber bundle length, referred to below as a matrix fiber bundle fraction, also influences the structure of the CMC composite material. This occurs in such a way that it leads to a homogeneous matrix structure, which distinguishes itself by fewer and smaller cracks in the matrix and a uniform distribution of the different substance components of the matrix, so that other phases than the intended one are only present in the matrix composition to a very small extent.

As a result of the substantially smaller length and mostly also smaller thickness and height of the fiber bundles of the matrix fiber bundle fraction, compared with the length and the other dimensions of the reinforcing fiber bundle fraction, the matrix fiber bundles can be disposed freely in the texture of the reinforcing fiber bundles and, in particular, can fill the space between the reinforcing fiber bundles in a well-mannered way. This results in an increased density of the CMC composite materials according to the invention and in a matrix structure which becomes substantially more homogeneous. This is because a substantially finer pore system is running through the fiber bundle skeleton of the composite materials according to the invention before the siliconizing than is heretofore known from the prior art. Furthermore, the geometrically smaller matrix fiber bundles also influence the crack formation in the matrix because the linkage of the matrix to the matrix fiber bundles does not lead to the same stress in the matrix as with the reinforcing fiber bundles. In both cases there is indeed a different coefficient of thermal expansion between the matrix and the fiber bundles. However, in the case of the matrix fiber bundles, stress is also originated in the matrix fiber bundles due to variation of the temperature of the fiber bundle/matrix system, which does not take place in the case of the large rigid reinforcing fiber bundles. Accordingly, the content of the stress is reduced in the matrix by the added matrix fiber bundles, as a result of which the matrix of the CMC composite materials according to the invention possesses a crack system with fewer and smaller cracks. This effect is intensified by the fact that, when the matrix is reacting with the fiber bundles, it is particularly the matrix fiber bundles having smaller dimensions which are attacked. As a result thereof they lose mass so that their reduced remaining mass accommodates stress to an increased extent due to the different thermal expansion of the fiber bundles and the matrix.

With the objects of the invention in view, there is also provided a method for manufacturing composite materials reinforced with fiber bundles and having a ceramic matrix, which comprises providing two different fractions of the fiber bundles including a reinforcing fiber bundle fraction and a matrix fiber bundle fraction with different average fiber bundle lengths, as basic materials; and providing a total fiber bundle distribution of the weight of the fiber bundles as a function of a length of the fiber bundles with a minimum between the average fiber bundle lengths of the reinforcing fiber bundle fraction and the matrix fiber bundle fraction.

The invention is distinguished in that the heretofore-known methods for the manufacture of CMC composite materials can be used for the manufacture of the composite materials according to the invention, if they use a reinforcing fiber bundle fraction and a matrix fiber bundle fraction during the manufacture of the composite materials as described above, instead of only one fiber or fiber bundle fraction as heretofore. In this way the CMC composite materials according to the invention are manufactured only by the change of the raw materials, unless the otherwise known advantages of the heretofore existing methods of manufacture fall behind.

The fiber bundles, which the CMC composite materials according to the invention contain or which are used in the method according to the invention for the manufacture of CMC composite materials, advantageously possess a protective layer in order to protect them from a too violent attack when reacting with the matrix system, so that they do not lose their reinforcing properties. An additionally improved protection of the fiber bundles bonded in the CMC composite materials according to the invention can be achieved with several possibly different, protective layers disposed one on top of the other. The protective layers which are preferentially used are formed of carbon, graphite, pyrolytic carbon, TiC, TiN, SiC, titanium diboride, zirconium diboride, hafnium diboride, compounds based on Si,B,C,N and compositions thereof. Another or additional fiber bundle protection can be achieved by a coating of the fiber bundles used during the manufacture with at least one layer of a pyrolyzable binder, which was solidified or cured. In particular, fiber bundles coated in this way can also be used in the methods of manufacture according to the invention. The protective layer is pyrolyzed during the manufacture of the CMC composite materials according to the invention.

All high-temperature-resistant fibers, but in particular carbon fibers, graphite fibers, SiC-fibers, aluminum oxide fibers, $Al_2O_3SiO_2$-fibers, $Al_2O_3SiO_2B_2O_3$-fibers, carbonized types of cellulose fibers, wood fibers and other organic fibers, as well as fibers highly resistant to elevated temperatures based on compounds which contain Si,C,B,N,Al, can be used to reinforce the CMC composite materials according to the invention and in methods of manufacture according to the invention. Likewise, nano fibers, whiskers and nanotubes can also be used to reinforce the CMC composite materials and in their manufacture, instead of the fibers contained in the fiber bundles.

The ceramic matrix of the CMC composite materials according to the invention preferentially have at least one phase of at least one of the substances carbon, silicon, boron, aluminum, zirconium, and/or alloys from the group including silicon carbide, silicon nitride, silicon oxide, boron nitride, boron carbide, SiBCN, $Al_2O_3$, $ZrO_2$, TiC, iron silicides and other silicides as well as glass ceramics. It is particularly preferred that the composite materials according to the invention have a matrix being formed of nearly only one of the aforementioned substances and alloys and only very few zones with a compound adjacent the main phase. That means, that with an alloy as a matrix, only small fractions of the phases of the individual alloying constituents are existing in the matrix. Furthermore, the ceramic matrix of the CMC composite materials according to the invention can also contain additions of iron, chromium, titanium, molybdenum, nickel or aluminum.

CMC composite materials, which are already used today for technical purposes with great requirements, preferentially contain carbon and graphite fibers because they are available on a commercial scale. They are mostly manufactured by pyrolysis from PAN fibers, pitch fibers, mesophase pitch, viscose fibers, phenolic fibers, polyphenylene fibers and hollow fibers. Therefore, CMC composite materials according to the invention are also preferentially reinforced with carbon or graphite fiber bundles and carbon and graphite fiber bundles are to be used preferentially in the methods of manufacture according to the invention.

The CMC composite materials according to the invention reveal their properties in a particularly pronounced manner as C/SiC composite materials, that is to say materials which have a ceramic matrix that essentially contains phases of silicon, carbon and silicon carbide.

There are various possibilities for the manufacture of the fiber bundle fractions used in the CMC composite materials according to the invention. One possibility would be to cut to size fresh fiber bundles with or without a protective layer in a cutting unit to defined lengths. In this case the length distribution of the fiber bundles in the composite material is put together nearly of discrete lengths which can be composed. In this as well as in other cases it is possible to compose the matrix and/or reinforcing fiber bundle fraction of different fiber bundle fractions. However, the invention is distinguished by the fact that the average fiber bundle length of both fractions is clearly different from each other.

Another way of manufacturing fiber bundles for the individual fiber bundle fractions is that a composite material which already contains the fiber bundles required for the manufacture of the CMC composite material according to the invention is converted by crushing and/or grinding processes into a grinding stock which then has fiber bundles of different length from the destroyed composite material as constituents. Using a classifying process, for example sieving, the grinding stock, that is the individual fiber bundles, can then be split up into individual fractions, which have different dimensions, and in particular different fiber bundle lengths. These fiber bundle fractions of different length distributions, which have been manufactured in this way, can then be used as matrix and/or reinforcing fiber bundle fractions for the manufacture of composite materials according to the invention. After the classifying and in particular the sieving of the grinding stock it is always possible for the individual fiber bundle fractions to also contain, in addition to their fiber bundles of the provided fiber bundle length, a fraction of overlong fiber bundles, that is to say fiber bundles with a substantially greater fiber bundle length than intended for the fraction. That is because such fiber bundles having an appropriate cross section, to some extent, can pass even lengthwise, for example, through a sieve. Since these overlong fiber bundles do not have any substantial influence on the manufacture of the CMC materials according to the invention, they can be added in the methods of manufacture according to the invention. Thus, the fiber bundle distribution of a CMC composite material according to the invention can still have a smaller fraction of overlong fiber bundles, in addition to the matrix fiber bundle fraction and the reinforcing fiber bundle fraction.

The CMC composite materials according to the invention distinguish themselves by a special selection of the distribution of the geometric dimensions of the fiber bundles contained in them from the CMC composite materials according to the prior art. Likewise, the methods of manufacture according to the invention improve the manufacture of CMC composite materials in such a way that the distribution of the geometric dimensions of the fiber bundles used in the method is subject to a selection.

These selected distributions are described below and recited in the claims as so-called fiber bundle distributions. This should be understood in the following to be the weight distribution of the fiber bundles in relation to the length of the fiber bundles. In other words, it can be deduced from the distributions, what weight the fiber bundles of a certain fiber bundle length have or what weight fraction the fiber bundles of a certain fiber bundle length have of the total weight of the fiber bundles.

The fiber bundle distributions of the CMC composite materials according to the invention and the associated methods of manufacture, that is the fiber bundle distributions according to the invention for short, distinguish themselves in particular by the following features:

The average fiber bundle length of the reinforcing fiber bundle fraction usually is between 4 mm and 20 mm, preferentially between 5 mm and 16 mm and particularly preferentially between 6 mm and 12 mm. The width at half maximum of the fiber bundle length distribution of the reinforcing fiber bundle fraction usually is between 0.01 mm and 15 mm, preferentially between 0.1 mm and 12 mm and particularly preferentially between 1 mm and 8 mm.

The average fiber bundlelength of the matrix fiber bundle fraction usually is between 0.2 mm and 5 mm, preferentially between 0.5 mm and 4 mm and particularly preferentially between 1 mm and 3.5 mm. The width at half maximum of the fiber bundle length distribution of the matrix fiber bundle fraction usually is between 0.01 mm and 5 mm, preferentially between 0.1 mm and 4 mm and particularly preferentially between 1 mm and 3.5 mm.

The average fiber bundle width of the reinforcing fiber bundle fraction usually is between 0.02 mm and 5 mm, preferentially between 0.1 mm and 3 mm and particularly preferentially between 0.5 mm and 2 mm. The width at half maximum of the fiber bundle width distribution of the reinforcing fiber bundle fraction usually is between 0.05 mm and 10 mm, preferentially between 0.1 mm and 7 mm and particularly preferentially between 0.5 mm and 3 mm.

The average fiber bundle width of the matrix fiber bundle is fraction usually is between 0.02 mm and 2 mm, preferentially between 0.1 mm and 1 mm and particularly preferentially between 0.3 mm and 0.7 mm. The width at half maximum of the fiber bundle width distribution of the matrix fiber bundle fraction usually is between 0.05 mm and 3 mm, preferentially between 0.1 mm and 2 mm and particularly preferentially between 0.5 mm and 1.5 mm.

The ratio of the average fiber bundle length of the reinforcing fiber bundle fraction to the average fiber bundle length of the matrix fiber bundle fraction usually amounts to between 1.5 and 10, preferentially between 1.8 and 7 and particularly preferentially between 2.1 and 5.

The ratio of the average fiber bundle length to the average fiber bundle width of the reinforcing fiber bundle fraction usually amounts to between 2 and 500, preferentially between 3 and 100, and particularly preferentially between 4 and 20.

The ratio of the average fiber bundle length to the average fiber bundle width of the matrix fiber bundle fraction usually amounts to between 2 and 500, preferentially between 3 and 100, and particularly preferentially between 4 and 20.

A further quantity with which the geometric dimensions of fiber bundles are often described, is the length/width/height ratio (L/W/H ratio) of the fiber bundles, in which the three geometric dimensions of the fiber bundles, length of the fiber bundle, width of the fiber bundle and height of the fiber bundle, are considered. In this case the fiber bundle length is first divided by the fiber bundle width and subsequently by the fiber bundle height.

The following statements can be made for the fiber bundle distributions according to the invention. The average length/width/height ratio of the fiber bundles of the reinforcing fiber bundle fraction usually is between 2 and 50,000, preferentially between 5 and 2,000 and particularly preferentially between 10 and 100, and the average length/width/height ratio of the fiber bundles of the matrix fiber bundle fraction usually is between 2 and 50,000, preferentially between 10 and 5,000 and particularly preferentially between 30 and 500.

Moreover, the fiber bundle distributions according to the invention are distinguished in that the ratio of the weight of the matrix fiber bundle fraction to the total weight of the fiber bundles usually is between 0.1 and 0.8, preferentially between 0.2 and 0.5 and particularly preferentially between 0.27 and 0.33.

The methods of manufacture according to the invention for manufacturing CMC composite materials include, among others, all methods known from the prior art for manufacturing CMC composite materials, in so far as the fiber bundles used in the manufacture have a fiber bundle distribution according to the invention.

A preferred variant of the methods of manufacture, which follows the methods described in German Patent DE 197 49 462 C1, for example, includes a first step in which the two different fractions of fiber bundles are mixed, they are subsequently pressed, and thereafter the molded body manufactured in this way is infiltrated with polymers, in particular pyrolyzable polymers. At that time, additional fillers can also be infiltrated together with the polymers.

However, in most of the methods of manufacture according to the invention, the two different fractions of fiber bundles are added during a mixing process to other components for the manufacture of the composite material. The two different fractions of fiber bundles are preferentially mixed with at least one carbonizable binder during the mixing process. Above all, carbon particles, soot, cokes, graphite, silicon, carbides, nitrides, iron silicides and other silicides as well as borides are added additionally as fillers. In addition, during the mixing process other binders, for example from the group including polyvinyl alcohols, methyl, ethyl and butyl celluloses, can also be added.

Among the carbonizable binders, binders from the group including resins and pitches are preferentially used. Resins from the group including thermoplastics, phenolic resins, furan resins, polyacrylate resins, polyimide resins, cyanate resins and epoxy resins are used, above all, among resins. Solid and liquid pitches, mesophase pitches, coal tar pitches and petroleum pitches are used, above all, as pitches. However, binders from the group including polysilanes, polycarbosilanes, polysilazanes, monosaccharides and polysaccharides, polyallylcarbodiimides, oils and tars can also be used, for example, as carbonizable binders.

The weight fraction of the fiber bundles brought into the mixing process usually amounts in all to 50 to 99% of the total weight of the mixture, preferentially 60 to 90% and particularly preferentially 65 to 80% of the total weight of the mixture.

The weight fraction of the fiber bundles of the reinforcing fiber bundle fraction brought into the mixing process usually amounts to 20 to 80% of the total weight of the mixture, preferentially 35 to 65% and particularly preferentially 42 to 55% of the total weight of the mixture.

The weight fraction of the fiber bundles of the matrix fiber bundle fraction brought into the mixing process usually amounts to 10 to 40% of the total weight of the mixture, preferentially 15 to 35% and particularly preferentially 20 to 30% of the total weight of the mixture.

The mixture obtained by the mixing procedure is mostly subsequently compressed. This compressing preferentially takes place in a die press, isostatic press, continuous casting press, piston stroke press or an extruder, for example a screw-type extruder. One skilled in the art, with his or her knowledge of compaction processes, adjusts the pressure acting on the mixture in such a way that at the end of the methods of manufacture he or she reaches the CMC composite materials according to the invention. This compressing of the mixture preferentially occurs at an elevated temperature, if resins are present as binders in the mixture, particularly preferentially at temperatures above the curing temperature of the resin binders. However, it is also possible to only subsequently subject the compacted molded body to a temper process. Thus, with resins as binders it is also possible to subject the molded body after the compressing to a temper process above the curing temperature of the resin binders, in order to thereby cure the molded body.

With methods of manufacture according to the invention for producing CMC composite materials, having a matrix which contains carbon and/or carbides, for example C/SiC composite materials, the binders are mostly carbonized in a further process step.

Furthermore, the methods of manufacture according to the invention can also include process steps wherein carbonizable substances are brought once or several times into a pore system of the composite material to be manufactured through the use of a CVI process or impregnation, and the composite material to be manufactured is subsequently exposed to a carbonization step. These process steps are then preferentially used if a CMC composite material, having a matrix which contains carbon and/or carbides, is to be manufactured or is to be compacted during the manufacturing.

The above-described carbonization steps for the composite materials can be followed by the graphitization of the carbonized crude products at temperatures above 2000° C. as a further process step.

Methods of manufacture according to the invention for CMC composite materials, having a matrix which also contains silicon and/or silicides, for example C/SiC composite materials, preferentially include a final process step, in which a siliconizing is carried out. This final siliconizing can be carried out through the use of the infiltration of liquid silicon or silicon alloys from the group including iron, chromium, titanium, molybdenum, nickel and aluminum silicides or the CVI deposition of silicon, silicon carbide or other silicon compounds.

A further embodiment of the methods of manufacture according to the invention for producing composite materials with a SiC matrix, such as C/SiC composite materials, follows the methods described in German Published, Non-Prosecuted Patent Application DE 197 36 560 A1, although with the fiber bundle fraction being used having a fiber bundle distribution according to the invention.

In these methods of manufacture, the fiber bundles are first mixed with carbon powder and/or silicon carbide powder and/or molybdenum disilicide powder and/or boron carbide powder and/or boron nitride powder and/or aluminum nitride powder and/or titanium carbide powder. Moreover, solvents can also be added to the mixture. After the mixing, the mixture is then compressed according to the process steps described above. The molded body formed after the compressing is subsequently sintered, then impregnated with carbonizable substances and carbonized. Finally, a siliconizing step as described above also takes place in this case.

With the objects of the invention in view, it is additionally provided that the CMC composite materials according to the invention are used above all for great temperature stress, that is to say, for example, as parts of gas turbines such as turbine wheels, parts of burners, nozzles and parts thereof, hot-gas pipes, measuring probes, jacket tubes for probes, thermal protective components of space carriers and aircraft engines, thermal shields, carrier components for mirrors, antennas and reflectors, missile components, fire grates and components of heat exchangers. However, the preferred range of application of the CMC composite materials according to the invention is where a mechanical load is still added to the great temperature stress. Examples of such applications are friction materials such as brake discs and brake linings for aircraft, rail vehicles and motor vehicles and components of sliding bearings and sliding elements.

Other features which are considered as characteristic for the invention are set forth in the appended claims.

Although the invention is illustrated and described herein as embodied in a fiber-bundle-reinforced composite material having a ceramic matrix, a method for manufacturing a composite material and a method for manufacturing elements formed of a composite material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
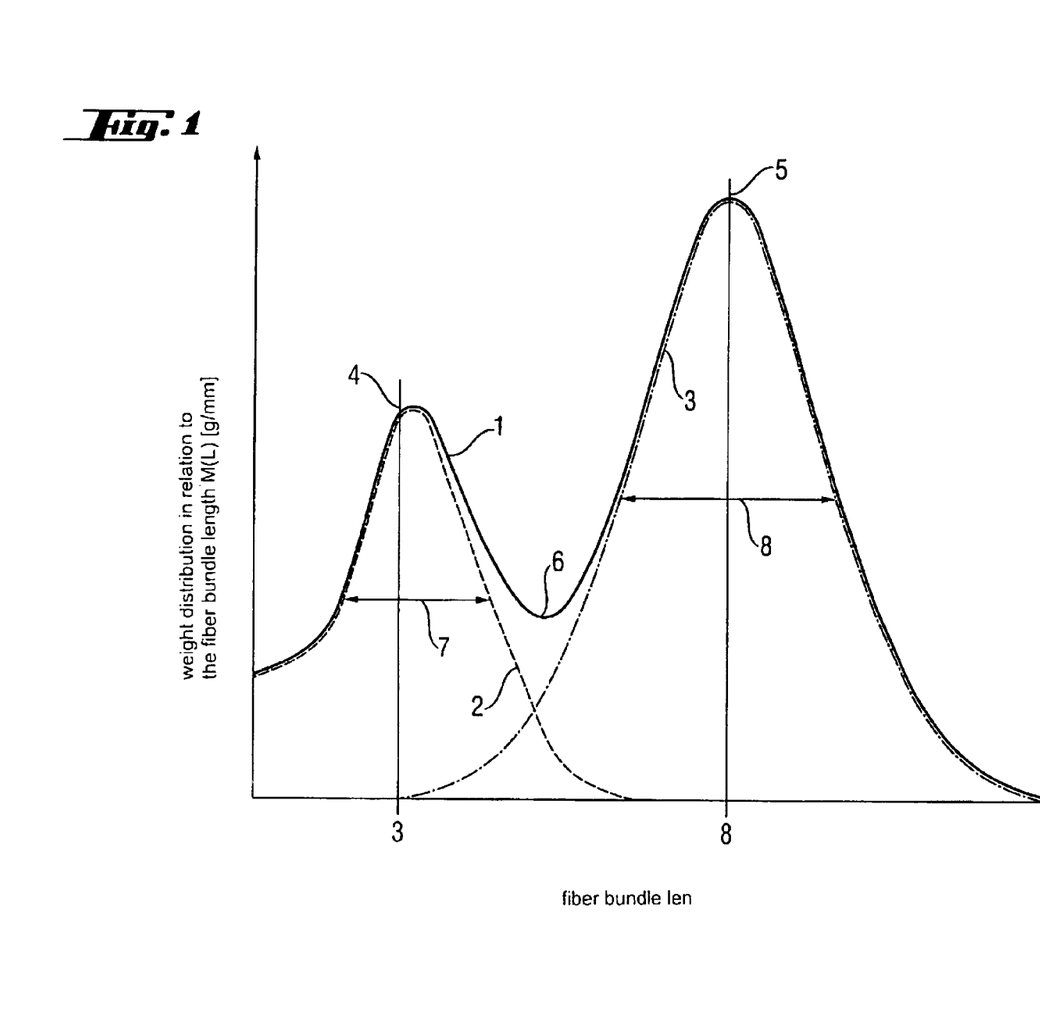
FIG. 1 is a graph of fiber bundle length plotted against weight distribution in relation to the fiber bundle length, for a CMC composite material according to the invention.

Referring now to the figures of the drawings in detail and first, particularly, to FIG. 1 thereof, there is seen an example of a total fiber bundle distribution 1 of a CMC composite material according to the invention. In this case, a distinction is to be made between a fiber bundle distribution 2 of a matrix fiber bundle fraction and a fiber bundle distribution 3 of a reinforcing fiber bundle fraction. The total fiber bundle distribution 1 results from a sum of the fiber bundle distributions 2 and 3. It can be clearly seen that an average fiber bundle length of a matrix fiber bundle fraction 4 is clearly different from that of a reinforcing fiber bundle fraction 5. As a result, the total fiber bundle distribution 1 possesses a minimum 6 between the average fiber bundle lengths 4 and 5. Furthermore, the fiber bundle distribution of the individual fiber bundle fraction can be characterized, among other things, by the width of half of a maximum 7 of individual fiber bundle distributions of a matrix fiber bundle fraction and the width of half of a maximum 8 of a reinforcing fiber bundle fraction.

Figure 2:
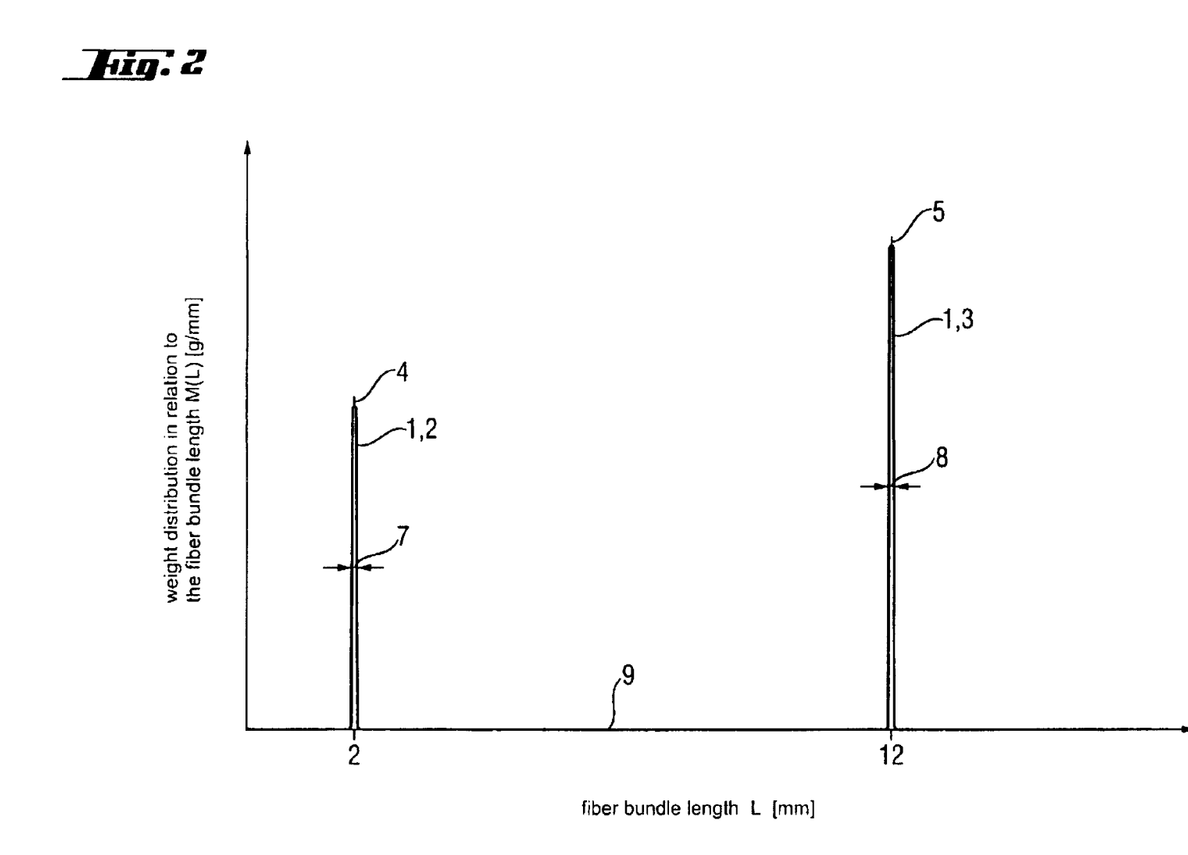
FIG. 2 is graph similar to FIG. 1 for another CMC composite material according to the invention.

FIG. 2 shows a total fiber bundle distribution 1 of another CMC composite material according to the invention. This fiber bundle distribution distinguishes itself by the fact that the fiber bundle distribution of the matrix fiber bundle fraction 2 as well as that of the reinforcing fiber bundle fraction 3 has a very small width at half the respective maximum 7, 8. A gap 9 in the total fiber bundle distribution 1 results therefrom. The fiber bundle distribution shown herein occurs, for example, if fiber bundles which are used in the process of manufacture of the CMC composite material were cut to size to defined lengths for both fiber bundle fractions.

Figure 3:
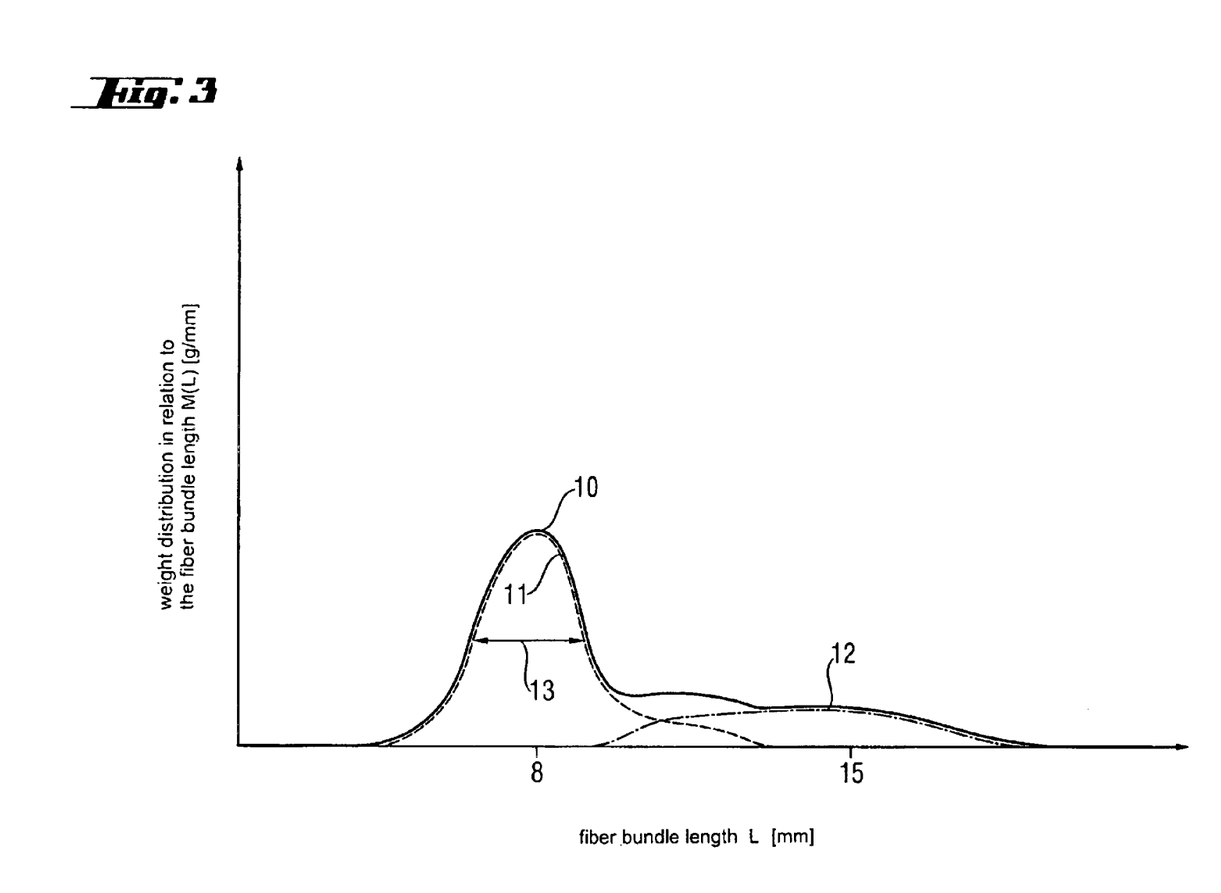
FIG. 3 is a graph similar to FIG. 1 for a sieve fraction.

FIG. 3 shows a total fiber bundle distribution 10 of a sieve fraction which results, for example, if a composite material containing C-fiber bundles was ground and a grinding stock was separated in a screening plant into individual sieve fractions. During the sieving, not only fiber bundles of a fiber bundle distribution 11 intended for the fraction pass through the sieve, but it is also possible for a certain fraction of very long fiber bundles to pass lengthwise through sieve apertures, as long as the cross section of the fiber bundle allows it. The result of this is that each sieve fraction has a fraction of overlong fiber bundles having a distribution 12 in FIG. 3 above the distribution of the actual sieve fraction 11. The two distributions 11 and 12 add up to the total fiber bundle distribution 10 of a sieve fraction. However, the width at half maximum 13 of the sieve fraction is not influenced by the fraction of overlong fiber bundles.

Figure 4:
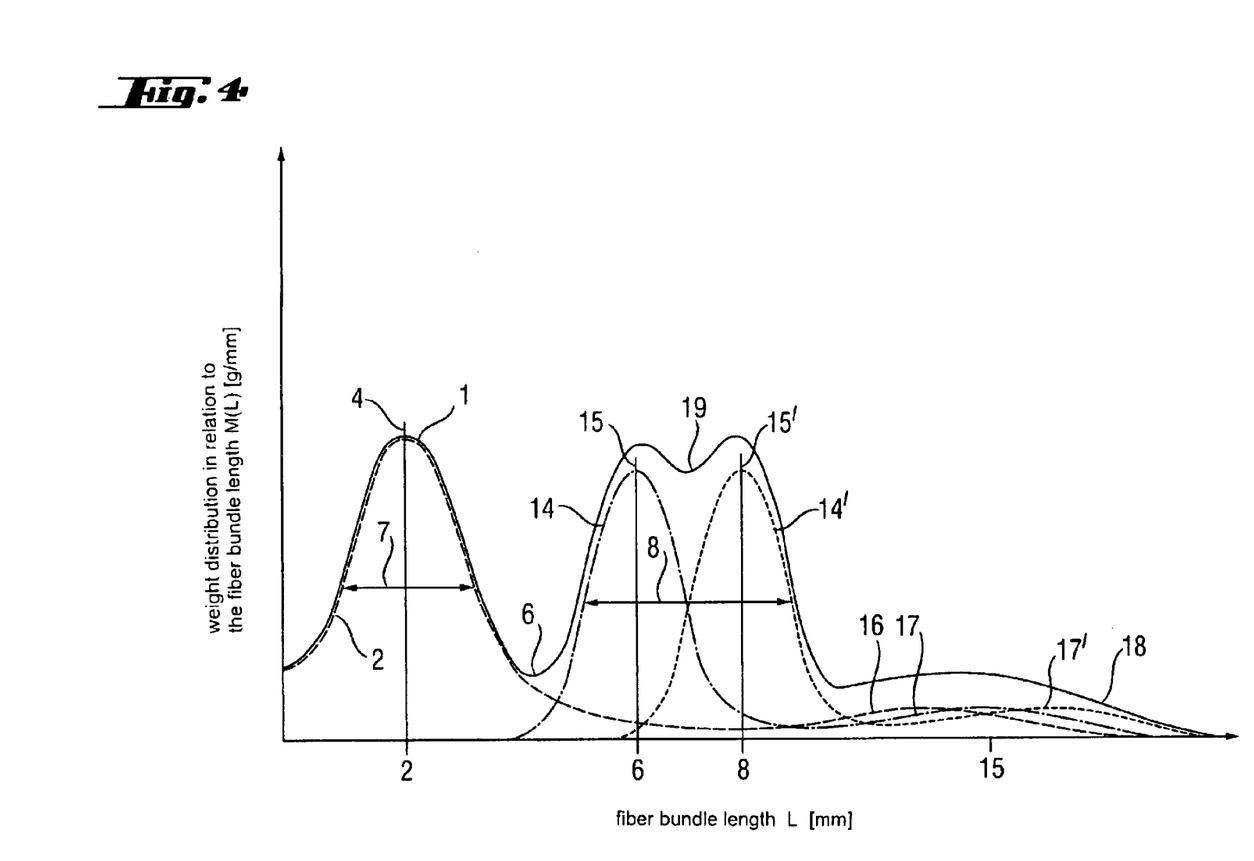
FIG. 4 is a graph similar to FIG. 1 for a further CMC composite material according to the invention.

FIG. 4 shows the total fiber bundle distribution 1 of another CMC composite material according to the invention. In this example the fiber bundles of the composite material are composed of individual sieve fractions. The matrix fiber bundle fraction is formed of one sieve fraction, having a fiber bundle distribution 2 which again possesses an extra fraction of overlong fiber bundles 16. The reinforcing fiber bundle fraction in this example is composed of two sieve fractions, having fiber bundle distributions 14 and 14' which are shown individually in FIG. 4. In this way, the total fiber bundle distribution 1 has a small minimum 19 in the range of the reinforcing fiber bundle fraction between averages 15 and 15' of the individual sieve fractions. However, this is substantially less pronounced than the minimum 6 of the total fiber bundle distribution between the matrix fiber bundle fraction and the reinforcing fiber bundle fraction.

Due to the composition of the reinforcing fiber bundle fraction of the two sieve fractions, the fiber bundle distribution of the reinforcing fiber bundles possesses a substantially greater width at half maximum 8 than at a half maximum 7 of the matrix fiber bundle distribution. Furthermore, it is also characteristic in this distribution, that the fractions of the overlong fiber bundles of the individual sieve fractions, that is to say the fraction of the matrix fiber bundles 16 with those of the individual sieve fractions of the reinforcing fiber bundles 17 and 17', add up to a total fiber bundle distribution of overlong fiber bundles 18 in the composite material.

Figure 5:
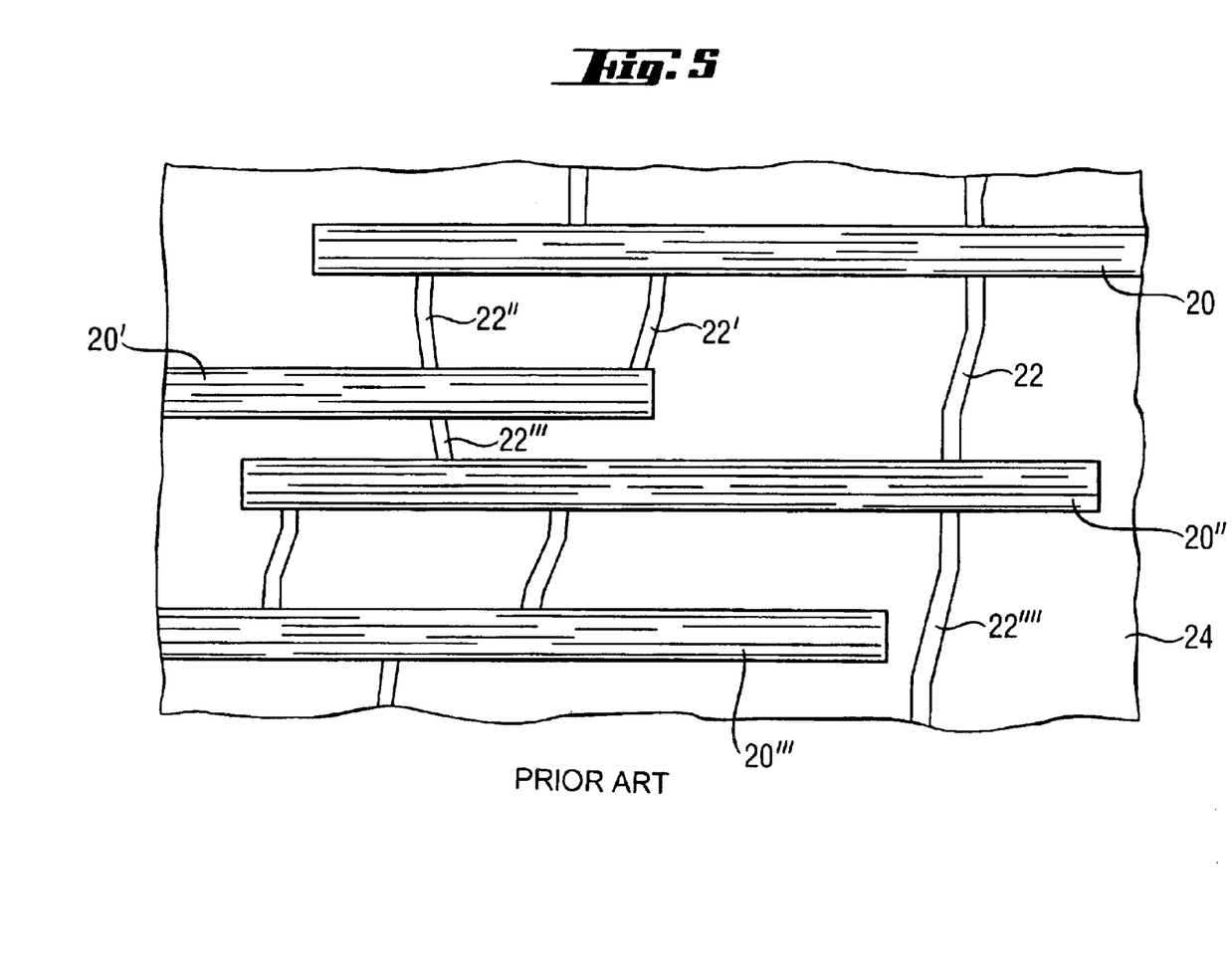
FIG. 5 is a fragmentary, diagrammatic view of a structure of a CMC composite material according to the prior art as seen, for example, in a micrograph.

FIG. 5 diagrammatically illustrates the structure of a CMC composite material according to the prior art as can be observed, for example, in a micrograph. Initially, it is noted that fiber bundles 20, 20', 20" and 20'" which are shown in a composite material are aligned unidirectionally in this example to simplify matters, but in general can also assume any other position with respect to each other. Furthermore, a remaining area of the section shows a ceramic matrix 24 of the composite material. This matrix has wide cracks, such as 22, 22', 22", 22'" and 22"", running through it. The cracks follow a path from fiber bundle to fiber bundle and are mostly created during cooling of the composite materials after their manufacturing, but can also be generated by great thermal stress on the materials. The cause of this crack formation, as already explained above, is the different thermal expansion behavior of the fiber bundles and the matrix which, in the case of thermal loads, leads to stress in the matrix, that then relaxes due to the crack formation.

Figure 6:
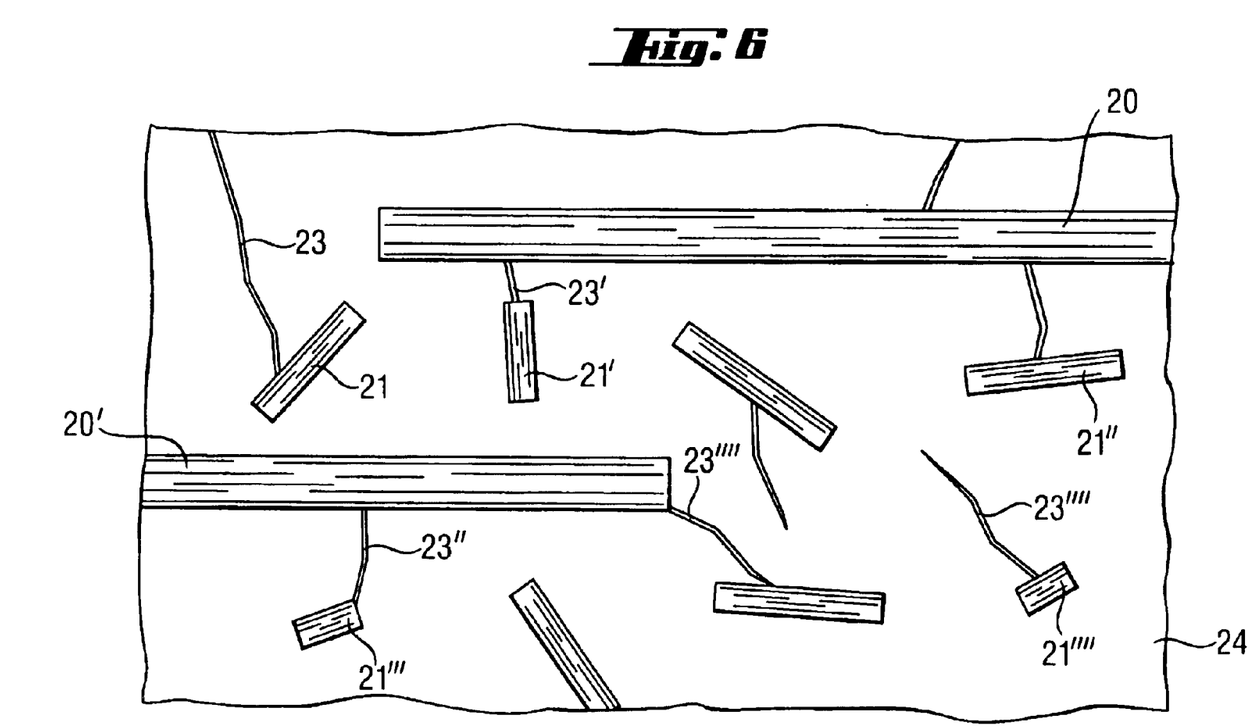
FIG. 6 is a view similar to FIG. 5 of a CMC composite material according to the invention.

FIG. 6 is a diagrammatic representation similar to FIG. 5 showing the structure of a CMC composite material according to the invention, as can be observed, for example, in a micrograph. It can be seen that a portion of reinforcing fiber bundles 20, 20' has been replaced by matrix fiber bundles 21, 21', 21", 21'", 21"" which are shorter and mostly also thinner as compared with the example shown in FIG. 5. Despite the unidirectional alignments of the reinforcing fiber bundles, the shorter matrix fiber bundles can be disposed in any direction between the reinforcing fiber bundles. A further essential difference is found in that the matrix 24 of the CMC composite material according to the invention has a completely different crack structure. The only cracks 23, 23', 23", 23'", 23"" that are found in the matrix are substantially smaller and are present to a lesser extent than those found in the structure of the corresponding CMC composite materials according to the prior art shown in FIG. 5. Moreover, the cracks, for example 23, 23"", do not display such a uniform alignment between the reinforcing fiber bundles as compared to those shown in the structure of FIG. 5. Furthermore, it can be observed that a portion of the cracks, for example the crack 23'"", does not have a path from fiber bundle to fiber bundle, but instead starts from a fiber bundle, for example 21"" and ends in the matrix. As already discussed above, this crack structure results because, in the case of a thermal load on the CMC composite materials according to invention, the stress caused by the different thermal expansion behavior of the fiber bundles and the matrix occurs not only in the matrix itself, but also in the matrix fiber bundles. The lower stress energy stored in the matrix system leads to only a portion of this energy being degraded by way of cracks. The reduced size of the cracks and the ending of cracks in the matrix itself is also typical the re for.

In the following, the CMC composite materials according to the invention and the improvements associated with them may be represented in an exemplary manner for C/SiC composite materials. In this respect, the C/SiC composite materials are only an example of the CMC composite materials according to the invention. According to the explanations given above, similar results can also be observed with other CMC systems.

In these examples, C/SiC composite materials according to the invention, which were manufactured on the basis of a reinforcing fiber bundle fraction and a matrix fiber bundle fraction according to a method disclosed in German Published, Non-Prosecuted Patent Application DE 197 10 105 A1, shall be compared with corresponding C/SiC composite materials which, however, have only one fiber bundle fraction.

Exemplary samples included the following fiber bundle constituents:

TABLE 1

Composition of fiber bundle fractions of the examples

| Sample No. | Matrix fiber bundle fraction | | Reinforcing fiber bundle fraction | |
| --- | --- | --- | --- | --- |
| | Fiber Bundle Weight [%] | Average Fiber Bundle Length [mm] | Fiber Bundle Weight [%] | Average Fiber Bundle Length [mm] |
| 1 | 0 | — | 100 | 18 ± 2.7 |
| 2 | 0 | — | 100 | 15 ± 2.55 |
| 3 | 0 | — | 100 | 11 ± 2.5 |
| 4 | 20 | 3 ± 1.5 | 80 | 16 ± 2.6 |
| 5 | 20 | 3 ± 1.5 | 80 | 15 ± 2.55 |
| 6 | 20 | 3 ± 1.5 | 80 | 11 ± 2.5 |

TABLE 1-continued

Composition of fiber bundle fractions of the examples

| Sample No. | Matrix fiber bundle fraction | | Reinforcing fiber bundle fraction | |
|---|---|---|---|---|
| | Fiber Bundle Weight [%] | Average Fiber Bundle Length [mm] | Fiber Bundle Weight [%] | Average Fiber Bundle Length [mm] |
| 7 | 30 | 3 ± 1.5 | 12 | 15 ± 2.55 |
| | | | 18 | 11 ± 2.5 |
| | | | 40 | 8 ± 2.5 |

The fiber bundle fractions used in the samples in this case have the following fiber bundle thicknesses:

TABLE 2

Dimensions of the individual fiber bundle fractions of the examples

| Average Fiber Bundle Length [mm] | Average Fiber Bundle Thickness [mm] |
|---|---|
| 3 ± 1.5 | 0.5 ± 0.4 |
| 8 ± 2.5 | 1.46 ± 0.7 |
| 11 ± 2.5 | 1.46 ± 0.75 |
| 15 ± 2.55 | 1.46 ± 0.8 |
| 16 ± 2.6 | 10 ± 1.5 |
| 18 ± 2.7 | 15 ± 2.5 |

All 7 samples of the examples were manufactured as follows:

First of all, a prepreg was manufactured from 3K carbon fiber bundles (3000 single filaments). The carbon fibers being used therefore have been manufactured on the basis of PAN fibers. For this purpose, the fiber bundles were interlaced to a twill fabric and the fabric was subsequently saturated in phenolic resin (resol type) and provided with a release paper on both sides. After this, the resinated fabric was heated to 130° C. in order to establish tackiness of the prepreg.

Subsequently, the prepreg plates were placed one on top of the other and pressed to form a compact. This was subsequently baked at 900° C., at which a firing curve has a gradient of 5° C. per minute in a range between 400° C. and 600° C. A CFC body obtained in this way was subsequently impregnated three times in succession in each case first with a coal tar pitch having a softening point of 60° C. and then also baked at 900° C. in order to compact it further.

The CFC body obtained in this way was then first crushed in a jaw crusher (manufacturer: Alpine Hosokawa) and subsequently cut into fiber bundles in a cutting mill (manufacturer: Alpine Hosokawa). Finally, the fiber bundles were classified in a wobble screening plant (manufacturer: Allgaier) into individual fiber bundle fractions, at which mesh bottoms (sieve area 1.15 m$^2$) have a clear mesh aperture of 0.5 mm, 1 mm, 2 mm, 3 mm, 4 mm and 6 mm in accordance with ISO 9044. The fiber bundle fractions described above were obtained as a result of this sieve procedure. In each case, the value after the ± sign indicates the half width at half maximum of the individual fractions, which are to be gathered from the fiber bundle distribution of the weight of fiber bundles of the individual fiber bundle fractions relating to the fiber bundle length and fiber bundle width.

After this, a mixture being formed of 70% of the total weight of fiber bundles according to the compositions shown above, 21% of the total weight of phenolic resin (resol type) as a binder and 9% of the total weight of coal tar pitch (softening point: 230° C.), was produced for each sample in a Z-arm kneader (manufacturer: Werner & Pfleiderer). The mixtures were subsequently pressed in a die press at a specific pressure of 12 Kp/cm$^2$ and a temperature of 130° C. This was followed by a carbonization of the samples at 900° C. under inert gas and a graphitization of the samples at 2000° C. for 24 hours. Finally, an infiltration of the samples at 1700° C. with liquid silicon took place in a vacuum with a silicon supply of one and a half times the weight of the samples, as a result of which the SiC structure of the matrix of the samples was generated.

When observing polished sections of the above samples in an optical microscope, the differences in the structure of the matrix of the samples can be clearly seen, depending on whether or not they contain a matrix fiber bundle fraction. The observed structures correspond to the diagrammatic representations of FIGS. 5 and 6. Whereas the samples which only contain a reinforcing fiber bundle fraction have large cracks in a considerable number in the matrix and the cracks have a path from fiber bundle to fiber bundle, the structure of the C/SiC samples according to the invention exhibits only fine cracks in a somewhat reduced number, at which the cracks partly starting from a matrix fiber bundle end in the matrix.

The change and greater density of the C/SiC samples according to the invention can also be seen with the help of their densities which are given for samples in Table 3.

Moreover, the phase fractions of the individual phases silicon, carbon and SiC contained in the samples are given by weight percent in Table 3. It can be seen that the fraction of the phases silicon and carbon is clearly reduced in the C/SiC samples according to the invention, which substantially improves the possibilities for using these materials. In this case, it has furthermore to be considered that the carbon fraction to a large portion originates from the carbon fiber bundles. Such materials were very suitable in particular in cases of applications with a mechanical load, such as friction linings. Good results have already been achieved with such materials, above all as brake discs.

TABLE 3

Density of the samples and composition of the samples in weight percent

| Sample No. | Density [g/cm$^3$] | Weight Fraction SiC [%] | Weight Fraction Si [%] | Weight Fraction C [%] |
|---|---|---|---|---|
| 1 | 2.10 | 31.2 | 24.8 | 44.0 |
| 2 | 2.01 | 30.0 | 25.0 | 45.0 |
| 3 | 2.08 | 30.0 | 25.2 | 44.8 |
| 4 | 2.43 | 51.8 | 16.7 | 31.5 |
| 5 | 2.41 | 51.2 | 16.5 | 32.3 |
| 6 | 2.43 | 51.6 | 16.5 | 31.9 |
| 7 | | 58.0 | 11.0 | 31.0 |

We claim:

1. A composite material, comprising:
   a ceramic matrix consisting of phases of silicon, carbon, and silicon carbide; and
   fiber bundles having two different fractions including a reinforcing fiber bundle fraction and a matrix fiber bundle fraction having lengths with different averages, each of said fiber bundles having a weight, said weights being proportional to said fiber bundle lengths, said weights being plotted to a graph of weight distribution versus fiber bundle length, said graph exhibiting a minimum between a first part of said distribution graph relating to said reinforcing fiber bundle fraction and a second part of said distribution graph relating to said matrix fiber bundle fraction;

a portion of said fiber bundles having at least one protective layer.

2. The composite material according to claim 1, wherein said fiber bundles contain fibers selected from the group consisting of carbon fibers, graphite fibers, SiC-fibers, aluminum oxide fibers, $Al_2O_3SiO_2$-fibers, $Al_2O_3SiO_2B_2O_3$-fibers, carbonized cellulose fibers, carbonized wood fibers, and fibers resistant to elevated temperatures based on compounds containing Si,C,B,N,Al.

3. The composite material according to claim 1, wherein said fiber bundles contain at least one of nano fibers, whiskers, and nanotubes.

4. A composite material, comprising:

a ceramic matrix consisting of phases of silicon, carbon, silicon carbide, and a phase selected from the group consisting of phases of aluminum, zirconium, silicon nitride, boron nitride, boron carbide, SiBCN, $Al_2O_3$, $ZrO_2$, TiC, and an iron silicide; and fiber bundles having two different fractions including a reinforcing fiber bundle fraction and a matrix fiber bundle fraction having lengths with different averages, each of said fiber bundles having a weight, said weights being proportional to said fiber bundle lengths, said weights being plotted to a graph of weight distribution versus fiber bundle length, said graph exhibiting a minimum between a first part of said distribution graph relating to said reinforcing fiber bundle fraction and a second part of said distribution graph relating to said matrix fiber bundle fraction.

5. A composite material, comprising:

a ceramic matrix consisting of phases of silicon, carbon, silicon carbide, and a phase selected from the group consisting of phases of aluminum, zirconium, silicon nitride, boron nitride, boron carbide, SiBCN, $Al_2O_3$, $ZrO_2$, TiC, iron silicides, and additions selected from the group consisting of iron, chromium, titanium, molybdenum, and nickel; and fiber bundles having two different fractions including a reinforcing fiber bundle fraction and a matrix fiber bundle fraction having lengths with different averages, each of said fiber bundles having a weight, said weights being proportional to said fiber bundle lengths, said weights being plotted to a graph of weight distribution versus fiber bundle length, said graph exhibiting a minimum between a first part of said distribution graph relating to said reinforcing fiber bundle fraction and a second part of said distribution graph relating to said matrix fiber bundle fraction.

6. The composite material according to claim 4, wherein said fiber bundles are carbon and graphite fiber bundles.

7. The composite material according to claim 1, including a fraction of overlong fiber bundles, in addition to said reinforcing fiber bundle fraction and said matrix fiber bundle fraction.

8. The composite material according to claim 1, wherein at least one of said reinforcing fiber bundle fraction and said matrix fiber bundle fraction are composed of several fiber bundle fractions with different average fiber bundle lengths.

9. The composite material according to claim 1, wherein said average fiber bundle length of said reinforcing fiber bundle fraction is between 4 mm and 20 mm.

10. The composite material according to claim 1, wherein said average fiber bundle length of said matrix fiber bundle fraction is between 0.2 mm and 5 mm.

11. The composite material according to claim 1, wherein said reinforcing fiber bundle fraction has an average fiber bundle width between 0.02 mm a 5 mm.

12. The composite material according to claim 1, wherein said matrix fiber bundle fraction has an average fiber bundle width between 0.02 mm and 2 mm.

13. The composite material according to claim 1, wherein a ratio of said average fiber bundle length of said reinforcing fiber bundle fraction to said average fiber bundle length of said matrix fiber bundle fraction is between 1.5 and 10.

14. The composite material according to claim 1, wherein a ratio of said average fiber bundle length of said reinforcing fiber bundle fraction to an average fiber bundle width of said reinforcing fiber bundle fraction is between 2 and 500.

15. The composite material according to claim 1, wherein a ratio of said average fiber bundle length of said matrix fiber bundle fraction to an average fiber bundle width of said matrix fiber bundle fraction is between 2 and 500.

16. The composite material according to claim 1, wherein said reinforcing fiber bundle fraction has an average length/width/height ratio of between 2 and 50,000.

17. The composite material according to claim 1, wherein said matrix fiber bundle fraction has an average length/width/height ratio of between 2 and 50,000.

18. The composite material according to claim 1, wherein a ratio of a weight of said matrix fiber bundle fraction to a weight of all fiber bundles is between 0.1 and 0.8.

19. The composite material according to claim 1, wherein said reinforcing fiber bundle fraction has a width at half maximum of said first part of said graph relating to said reinforcing fiber bundle fraction between 0.01 mm and 15 mm.

20. The composite material according to claim 1, wherein said matrix fiber bundle fraction has a width at half maximum of said second part of said graph relating to said matrix fiber bundle fraction between 0.01 mm and 5 mm.

21. The composite material according to claim 1, wherein said phases of silicon in said ceramic matrix are elemental silicon.

22. The composite material according to claim 1, wherein said phases of carbon in said ceramic matrix are elemental carbon.

* * * * *